INVENTOR.
DONALD B. MAC LEOD
BY Robert G. Clay
ATTORNEY

INVENTOR.
DONALD B. MACLEOD

BY Robert G. Clay

ATTORNEY

INVENTOR.
DONALD B. MACLEOD
BY Robert G. Clay
ATTORNEY

United States Patent Office 3,342,951

Patented Sept. 19, 1967

3,342,951

SERVO CONTROL SYSTEM AND METHOD IN A HELICAL SCAN RECORDER

Donald B. MacLeod, Redwood City, Calif., assignor to Ampex Corporation, Redwood City, Calif., a corporation of California Filed Apr. 20, 1964, Ser. No. 360,921
11 Claims. (Cl. 179—100.2)

This invention relates to wideband recording and reproducing systems, and to methods for controlling such systems, and more particularly to a servo control system for a magnetic tape recorder using a helical scanning head drum.

Accurate time base control is required for wideband recording and reproducing systems because of the errors or distortions which are introduced in the recorded or reproduced data by excessive time base error. If the system is used for recording a television signal, for example, an excessive time base error may result in picture distortion, loss of synchronization and other disruptive effects. Such effects may result in a failure to meet established broadcast standards, but even where there is no such requirement, as in a closed circuit system, it is often very difficult to obtain good picture stability or to reproduce previously recorded material on a different machine. If a wideband recording system is used for digital data, errors in the data will be introduced unless expensive redundancy or time base compensation techniques are used.

For these reasons, it is now conventional in wideband recording systems, such as magnetic tape recording and reproducing systems, to use servo control of various parts of the system in such fashion that successively finer corrections of the time base are introduced. In the most widely used magnetic tape recording system, a rotary head drum containing a number of magnetic heads scans across a moving tape in a generally transverse direction as the tape is moving at a relatively slower speed. On reproduction of these recorded signals, the speed of the tape capstan, the head drum, and other mechanisms may be servo controlled, either with respect to timing tracks laid down during the prior recording, or with respect to time stable synchronizing signals. These successive compensations may cumulatively provide highly accurate adjustment of the time base. When combined with electronically adjustable delay circuits, such systems can provide adjustment to within a relatively few nanoseconds of the true time base. They have accordingly found wide use in the recording and reproduction of television signals, and in the acquisition and reproduction of digital and instrumentation data under circumstances where extremely high information content must be processed.

A lower cost version of a magnetic tape recorder uses only one or two scanning heads, and is primarily intended for use with television program material. For such applications, reductions in cost size and weight are of primary importance, although adequate time base stability is still required. These systems employ a relatively simpler arrangement in which the tape is wrapped helically about at least a part of a split cylinder within which a head drum rotates to pass the heads in contact with the tape. The wrap of the tape around the cylinder provides a relatively low angle of inclination of the path of the heads relative to the longitudinal axis of the tape, so that relatively long individual tracks are defined along the tape. The simplictiy of this system is partially derived from the fact that each recorded track may be sufficient for each track to contain a full field of recorded picture information. Servo control of the head drum and of the capstan is utilized to insure proper recording and playback. The control is based upon use of a timing track signal recorded on the tape in accordance with head drum timing signals which represent the instantaneous angular position of the head drum. The timing track signal accordingly provides a reference for use during playback.

One highly desirable feature during recording is the recording of the individual fields such that the vertical blanking interval has a desired relationship to the disposition of the heads relative to the tape. The tape is so arranged, in angle and in width, that at particular times one head is in contact with the tape at the start of a track while at the same time the other head is in contact with the tape at the end of its track. Thus, there is an overlap interval in which both heads are in contact with the tape. If this overlap interval is caused to coincide with the vertical blanking interval, or with the start of the vertical blanking interval, switching between the heads may be accomplished with minimum adverse effects. First, no transient is introduced into the reproduced video segment of the signal. Second instantaneous timing errors due to tension and dihedral errors at switching time cause minimum disruption if switching occurs during vertical blanking because the automatic frequency control circuits in a television receiver can adjust before the end of the blanking interval.

Of course, the better the time base stability of the signal on playback after initial recording the easier it is for the signal to meet established broadcast television standards, and the more readily the system may be used in more critical applications. The obvious expedient to provide this time base stability would be a complex servo system used in conjunction with large and expensive motors having very low speed variation. The use of such components, however, would materially increase the complexity and cost of the system, as well as its weight and bulk. Added to this is the fact that individual motor drive amplifiers and large transformers are normally used for such systems, thus further increasing the power requirements, size, weight and the heat generated by the system. It is therefore highly desirable to be able to achieve a high degree of time base stability with low cost motors and relatively simple, lightweight driving systems.

It is therefore an object of the present invention to provide an improved control system for a magnetic tape recorder.

Another object of the present invention is to provide improved control systems for wideband recording and reproducing systems utilizing high speed and low speed moving members.

Yet another object of the present invention is to provide an improved method for obtaining precise control of a pair of moving elements in a wideband tape recorder utilizing a scanning head drum.

A further object of the present invention is to provide a low cost drive system having extremely low weight for the capstan and scanning head drum in a recording and reproducing system.

Yet another object of the present invention is to provide an improved means of controlling head drum speed and capstan speed during record and playback modes of operation in wideband magnetic tape recording and reproducing system.

These and other objects of the invention are met by an arrangement which provides low cost and lightweight means for controlling and driving the relatively fast and relatively slow moving members of a head drum scanning system in a wideband recording and reproducing system. One feature in accordance with the invention is the use of a single servo system which is alternately utilized to drive the head drum during recording and the capstan during playback. The heads are thereby caused to track properly during playback, but the introduction of cumulative time base errors is avoided. Other features of the invention permit the utilization of relatively low cost motors, and high efficiency square wave drive systems, together with means for filtering out short-term speed fluctuations.

In a specific example of a magnetic tape recording and reproducing system in accordance with the invention, a head drum in a helical scan recorder scans the tape along successive tracks at relatively high speed, as the tape is longitudinally advanced at a relatively slower speed by a capstan. A control track representative of actual drum speed variations is recorded longitudinally on the tape during recording. Drum tachometer signals are also compared in servo circuits to a reference signal, and the head drum speed is stabilized in accordance with the reference signal. During recording, the tape is driven at a selected rate of speed directly from an alternating current supply, in that the frequency of the signals from the source directly controls the speed of the tape capstan. On playback, however, the reproduced control signal is compared to the head drum speed signal, and used to control the capstan instead of the head drum, which at this time is controlled directly by the frequency of the signal from the alternating current supply. Although the tape is advanced such that the heads properly scan the recorded tracks, this arrangement greatly improves the time base stability of the system, because capstan speed variations on playback are not directly translated as drum speed variations. Instead, the stability of the supply is relied on as the primary factor in holding the recovered video signal constant, and any changes in capstan speed are very small compared to the much faster head drum speed.

Examples of specific drive amplifier circuits in accordance with the invention provide superior combinations of low cost, low weight and high efficiency of high performance systems. Semiconductor switching elements coupled in circuit with the motor are used to provide a high efficiency square wave drive signal through a relatively simple switching control using a minimum of transformer components. In conjunction with this system, odd harmonic components in the drive waveform, as well as torque pulsations in the operation of the motor itself, do not introduce substantial speed variations in the driven member because a low pass mechanical filter is used in the coupling so as to eliminate these speed variations. One aspect of these arrangements is the use of mutually coupled transformers in such fashion as to provide proper commutation of the switching devices. Another aspect is the use of starting and overload control circuits which prevent adverse effects from transients which may result in short circuit conditions or the failure of the circuit to start on initial application of power.

A better understanding of the invention may be had by reference to the following description, taken in conjunction with the accompanying drawings, in which.

Figure 1:
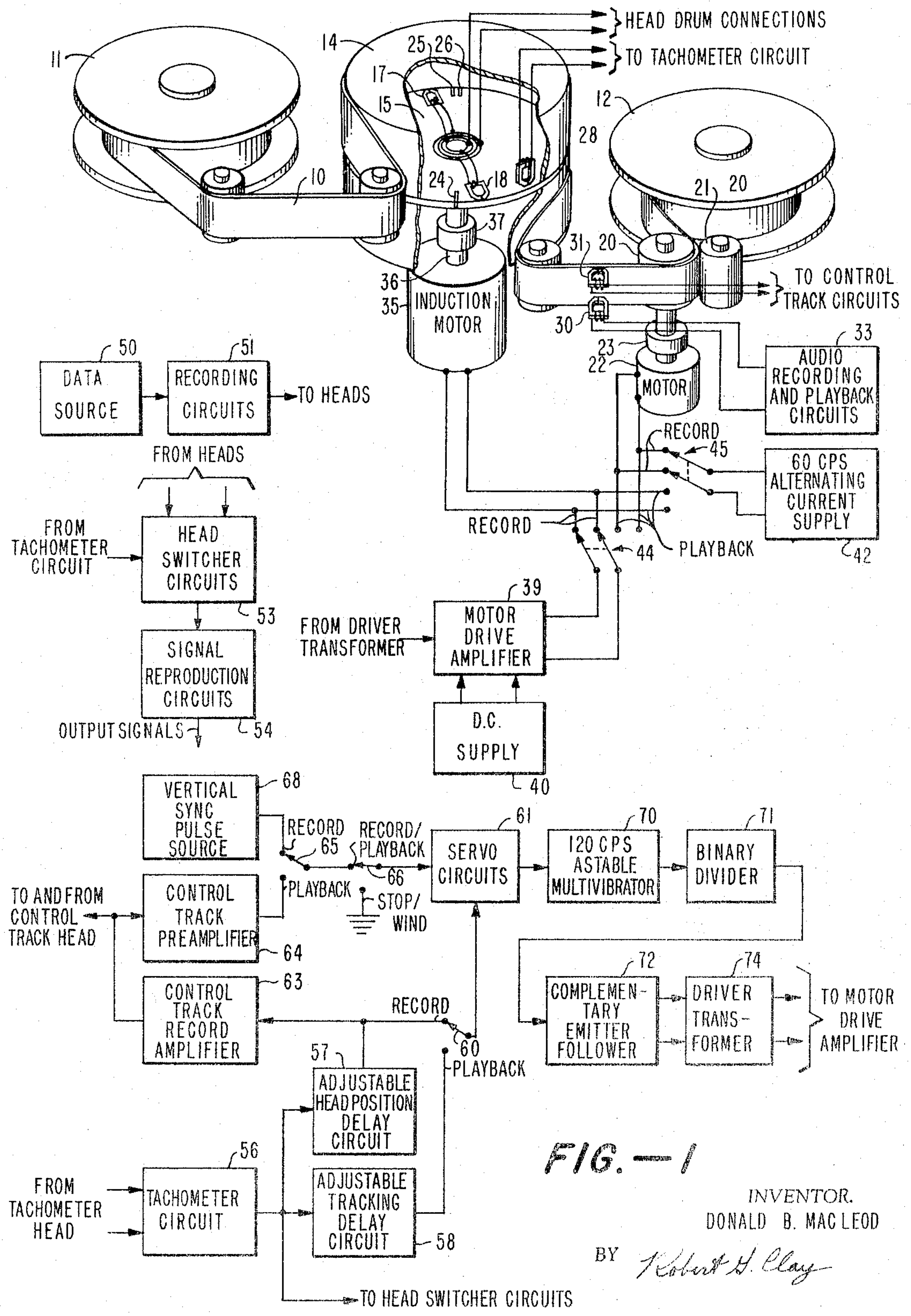
FIG. 1 is a combined simplified perspective and block diagram representation of one system in accordance with the invention, showing servo circuits and drive arrangements in accordance with the invention.

A wideband recording and reproducing system in accordance with the invention is illustrated in general form in FIG. 1, with many of the signal processing circuits and tape handling mechanisms being omitted for simplicity because they may be conventional. A tape 10 is fed between a supply reel 11 and a takeup reel 12 past an upstanding split cylinder 14 about which the tape 10 is wrapped helically for a selected circumferential distance, which here defines a wrap angle slightly in excess of 180°. The cylinder 14, greatly simplified in form, has a central circumferential slot within which rotates a head drum 15 containing a pair of magnetic heads 17, 18 which have pole surfaces at the outer periphery of the head drum 15. The heads 17, 18 pass in contact with the slowly moving tape 10 disposed about the cylinder 14, and scan along successive magnetic tracks on the tape 10 which are at a relatively slight angle (e.g. 9°) relative to the longitudinal axis of the tape. A ring and brush assembly (not shown in detail) may be utilized for applying signal to be recorded to the heads, and for coupling off reproduced signals from the heads 17, 18. The tape is longitudinally advanced at a relatively low speed such as 3.75" per second under the control of a capstan 20 and pinch roller 21, the capstan being driven by a hysteresis synchronous motor 22 as described below. The shaft coupling between the capstan 20 and the motor 22 includes a compliant coupling in the form of a ball or disk 23.

The head drum 15 also includes a set of integral magnetic elements 24, 25 and 26 disposed in the surface of the head drum 15, and circumferentially placed so that one magnetic element 24 is 180° displaced from another element 25, and the third element 26 is displaced by only a relatively small angle, such as at 15°, from the second element 25. A magnetic head 28 positioned adjacent the head drum 15 generates signals as the magnetic elements 24–26 pass adjacently, these signals being coupled to the tachometer circuit described below. The paired magnetic elements 25, 26 not only provide an indication of the angular position of the head drum 15, but also enable a selected index position on the head drum 15 to be distinguished from the position which is 180° displaced. The system also includes conventional erase head means (not shown), an audio head 30 and a control track head 31 disposed adjacent the opposite edges of the tape 10. The audio head 30 is coupled to audio recording and playback circuits 33, and the control track head 31 is coupled to control track circuits described below.

The head drum 15 is driven from an induction motor 35 by a coupling through a shaft 36 which also includes a compliant coupling in the form of a rubber ball or disk 37. Energizing and speed determining signals for the drum motor 35 and the capstan motor 22 are derived separately from a motor drive amplifier 39 which itself is powered from a DC supply 40, shown separately for clarity only, and from an alternating current supply 42. The source used for driving a given motor depends upon the mode of system operation. In the record mode a two-pole, two-position switch 44 couples the motor drive amplifier 39 to the drum motor 35, while a two-pole, two-position switch 45 couples the AC supply 42 to the capstan motor 22. In the playback mode the switches 44, 45 couple the motor drive amplifier 39 to the capstan motor 22, and the AC supply 42 to the drum motor 35, respectively. Both the motors 22, 35 are synchronous, in the sense that they rotate at a speed which is directly determined by the frequency of the alternating drive signal. The rotational rate may be a multiple or sub-multiple of, as well as equal to, the drive signal frequency.

Timing pulses to control the switching of the motor drive amplifier 39 are derived from servo circuits, as described below. In this arrangement only one motor drive amplifier is used, with consequent savings of size, weight and expense. In the event that separate amplifiers are needed for a specific purpose the alternating current signal can still provide a timing reference. For example, timing pulses may be generated from the AC waveform by a zero crossing detector which actuates a monostable multivibrator at each positive (or negative) going zero crossing of the sinusoidal wave, or by a high-gain, current-limiting amplifier which serves as a square wave generator.

The recording and reproducing circuits for this system have not been shown in detail, but are only represented in generalized form. Signals to be recorded are provided from a data source 50 through recording circuits 51 to the heads 17, 18 on the head drum 15. Reproduced signals generated during the playback mode are coupled from the heads 17, 18 through head switcher circuits 53, where they are combined under the control of switching signals derived from the tachometer circuit into a single, substantially continuous television signal. This signal is thereafter further amplified and processed in signal reproduction circuits 54, and provided as output signals from the system.

The remainder of the control system in accordance with the invention has been illustrated only in generalized form. Signals from the tachometer head are coupled to a tachometer circuit 56 which generates a square wave signal representative of the instantaneous angular position of the head drum, and also the phase of the head drum relative to the tape. This signal is applied to the head switcher circuits 53, and also coupled through either of two delay circuits, an adjustable head position delay circuit 57 and an adjustable tracking delay circuit 58. In the record mode, a two-position, single-pole switch 60 couples the timing signal to servo circuits 61 through the head position delay circuit 57, whereas in the playback mode, the switch couples the signals through the tracking delay circuit 58. The head position delay circuit 57 introduces a relatively small control range, in order to permit head switching to be adjusted to compensate for circuit drifts and like effects. The tracking delay circuit 58 provides a substantially greater delay, equal to a full wavelength at the operating frequency of the timing signal. This full range of tracking delay permits either head to scan given alternate tracks on the tape, for best matching of playback characteristics and minimization of instantaneous time base errors at switching times.

When operating in the record mode, the square wave timing signals from the tachometer circuit 56 are applied through a control track record amplifier 63 to the control track head 31. The square wave recorded signal is later reproduced as a series of pulses, due to the responsiveness of the conventional head 31 to rate of change of flux. The pulses are applied through a control track preamplifier 64 to a switch 65 and thence to the servo circuits 61 as a reference signal for comparison to the timing signals from the tachometer circuit 56. This input of the servo circuits 61 may be disabled by a switch 66 which is coupled to ground when the system is in the stop or rewind modes. Alternatively, in the record mode, the switch 65 provides a reference signal to the servo circuits 61 from a vertical synchronizing pulse source 68, or some other source of time stable reference pulses. In the typical situation, a vertical sync pulse source 68 will comprise a studio video signal source, to which a synchronizing signal stripper circuit is coupled to derive the 60 cycle per second vertical sync pulses.

In both the record and playback modes, the servo circuits 61 compare the phase of the reference signals to those of the reproduced timing signals, and generate a varying amplitude signal which is representative of the phase relation. The output signal is converted into an appropriate signal for controlling the switching of the motor drive amplifiers, by application to a pulse generator system driven by a controlled oscillatory circuit. Here a frequency controllable 120 cycle per second astable multivibrator 70 is coupled to a binary divider 71, such as a bistable multivibrator circuit which receives trigger input signals from the astable multivibrator 70. The square wave output signal from the binary divider 71 is a nominal 60 cycle per second wave which drives a driver transformer circuit 74 through a complementary emitter follower circuit 72. The output signal from the driver transformer circuit 74 is therefore an alternating polarity square wave suitable for switching the states of the motor drive amplifiers in alternating fashion.

The operation of the system of FIG. 1 provides a substantial improvement in the time base stability of wideband recording and reproducing systems of this type, with actual simplification of the drive systems which are used. As described immediately above, the error signal from servo circuits 61 is used to provide a square wave whose instantaneous frequency is representative of a desired speed correction. This square wave switches the motor drive amplifier 39 through the driver transformer 74 at a corresponding rate, nominally 60 cycles per second. In accordance with the conventional operation of an induction motor 35 a signal of this frequency drives the output shaft 36 and the associated driven member at a speed of 30 cycles per second. With a pair of magnetic heads 17, 18 on the drum 15, sixty tracks per second are recorded along the tape 10, there being one track per field. Because the vertical sync pulses from the source 68 are compared in phase relation to the timing waveform from the tachometer 56, and because this timing waveform is controlled by the position of the head drum 15 itself, the vertical blanking interval in the recorded television signal is maintained such that it falls within the overlap interval during which both heads 17, 18 are in contact with the tape 10. Stated in another way, the magnetic elements 24–26 may be so positioned relative to the heads 17, 18, that the signals which are generated from the magnetic elements 24–26 insure, when the system is properly operating, that the servo control holds the blanking interval in proper relation to the overlap interval. Because the head switcher circuits 53 are also controlled by the timing waveform from the tachometer circuit 56, the disruptive effects of introducing a switching transient in the video portion of the picture are avoided, and time base errors are also minimized.

It will be noted that the square wave from the motor drive amplifier 39 which powers the induction motor 35 in the record mode contains odd harmonic frequency components which inherently present torque fluctuations and consequently speed variations in the operation of the induction motor 35. In addition, although induction motors are of relatively low cost, they have inherent speed fluctuations, even with an ideal input wave. Through the use of the compliant coupling 37, however, in conjunction with the inertia of the motor 35, shaft 36 and head drum 15 system, these irregularities in the rotational speed of the head drum 15 are substantially eliminated. The speed of the head drum 15 is accordingly servoed to the time stable sync pulses during recording, and the head drum 15 rotates with only the inherent time base displacements, principally flutter, which cannot be completely eliminated in any mechanical system.

The time base errors in the timing waveform which is recorded on the control track, however, also contain a component which is derived from instantaneous speed variations in the operation of the capstan mechanism. However, in recording the capstan motor drive amplifier 44 is operated directly from the 60 cycle alternating current supply 42 and the peak-to-peak time stability of this signal is excellent. Accordingly, the principal variant from a true 60 c.p.s. wave in the recorded timing waveform is the component derived from the head drum speed variation.

On playback, the drive sources for the drum motor 35 and the capstan motor 22 are reversed, so that the scanning speed of the head drum is now determined solely by the peak-to-peak stability of the signal from the alternating current supply 42. The tracking of the heads 17, 18 on the previously recorded patterns is therefore determined solely by variations in the speed of the capstan 20, as determined by the operation of the capstan motor 22. It is found that this system provides an appreciable increase in the stability of the video signal on playback. Despite the use of low cost motors and square wave drives, the video playback stability is held, in one typical practical exemplification of the invention, to within +0.15 microsecond of the true time base for one drum revolution.

Consideration of the various factors which contribute to proper system operation and to time base errors will permit an appreciation of these considerations. The head to tape speed is very high (approximately 650 i.p.s.) relative to the longitudinal tape speed (3.75 i.p.s.). The servo is referenced to vertical sync, and maintains the switching time within or at the start of the vertical blanking interval. The capstan 20, being driven directly by the alternating current supply 42, does not affect operation of the servo and has very slight effect on the head-to-tape speed. The stability of the supply 42 insures against major deviations, but longitudinal tape speed variations are not of substantial effect because of the much greater head drum speed. As the head drum scans a full track at 650 i.p.s., the tape is moved a very much smaller distance at 3.75 i.p.s.

When the head drum 15 is servoed during both record and playback, the flutter on playback is the cumulative total of head drum and capstan (longitudinal tape speed) flutter during record plus head drum and capstan flutter during playback. The capstan variations may result from tape tension variations which cause slippage, or from eccentricities in the capstan or its drive shaft. On playback, however, capstan flutter becomes significant because capstan speed variations affect the displacement of the control track to which the head drum is referenced. To compensate for these displacements the head drum must be speeded up or slowed down proportionately. Thus a 1% change at 3.75 i.p.s. now requires a compensating 1% change at 650 i.p.s. in order for the head to stay precisely on track. Consequently, apperciable time base variations can be introduced in the signal being reproduced.

When the capstan is servoed and the head drum is driven directly from the AC supply, however, the reproduced video signal is subjected only to the flutter inherent in the head drum over a scanned track or one television field. All that the capstan system need do is maintain the track being scanned under the magnetic head which is then reproducing signals. Any changes in speed needed to maintain this condition are at the most small fractions of the scanning speed. Therefore the primary stability of the recovered signal is determined by the drum, and the effects of capstan speed variations are second order in magnitude. Additionally, playback in this manner permits locking of the head drum to the most stable reference available and avoids the time displacement errors present in the control track. These errors will typically be of the order of 250 microseconds, peak-to-peak, at 2 c.p.s. in a practical system. The time base stability of the reproduced video accordingly is greatly enhanced.

Additional improvements in performance are achieved by this arrangement. The tracking controls 57, 58 may be adjusted without affecting the reproduced picture, because the head drum is driven independently. Change of the control settings alters capstan operation only, so that there is no appreciable video sync frequency shift, and no appreciable raster wobble. This is of particular significance at start of playback, because the system can lock on to the proper track relationship with minimum raster wobble.

It is found that the servo system considerations for the head drum, which operates at much higher speed, are all that need be considered in the use of a system of this nature. Satisfaction of the servo requirements of the head drum automatically satisfy the requirements of the capstan drive system.

Figure 2:
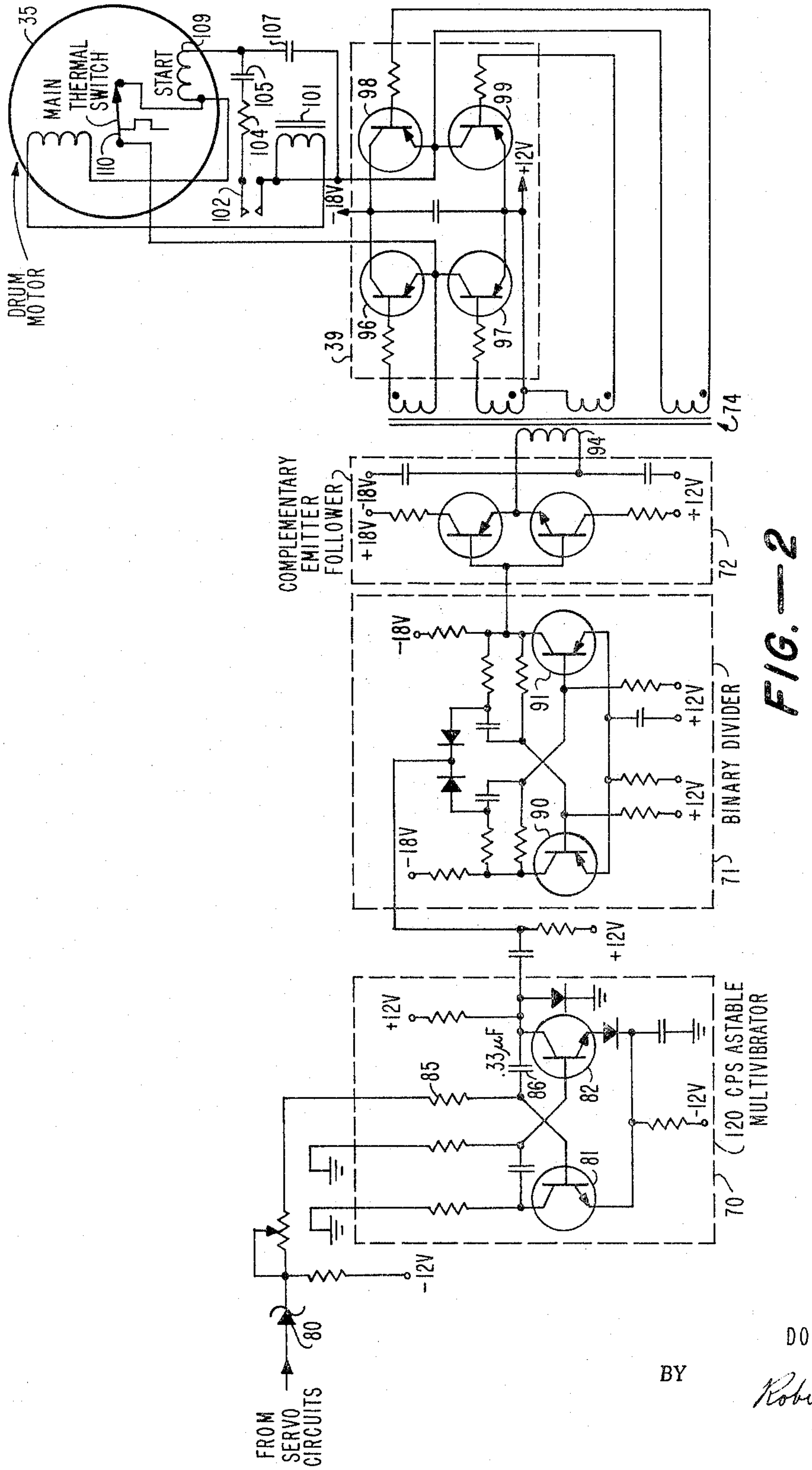
FIG. 2 is a schematic diagram of square wave generator circuits and one form of motor drive circuit in accordance with the invention.

A particularly useful system for generating the triggering pulses for the motor drive amplifiers, and for providing the motor drive amplifier for the head drum, are shown in the schematic diagram of FIG. 2.

In FIG. 2, input signals to the astable multivibrator

70 of FIG. 1 are provided from the servo circuits 61 of FIG. 1 in the form of an analog or varying amplitude direct current level. This signal, in one practical system, is caused to vary about a nominal +6 volt level, and is converted to a nominal zero volt level by a zener diode 80. Plus or minus variations of this signal from the zero volt level determine the deviation in frequency, from a nominal frequency of 120 c.p.s., of an astable multivibrator 70 which comprises principally a pair of transistors 81, 82 having a timing network 85, 86 and the conventional cross-coupling between them. The opposite states of the astable multivibrator 70 are made highly asymmetric, in order to increase the frequency stability of the system. The positive-going pulses at the collector of the transistor 82 are brief in duration, relative to the negative-going portion of the wave, the positive-going portions of the wave being determined by the conducting interval of the transistor 82. With this arrangement, a resistor 85 and a capacitor 86 in the timing circuit are the principal frequency determining factors of the circuit.

The positive-going pulses from the multivibrator 70 are applied as trigger impulses to the two halves of a binary divider 71, reversing the state of the binary divider 71 at the nominal 120 c.p.s. rate, thus providing a square wave having a nominal 60 c.p.s. rate. The binary divider comprises primarily a pair of transistors 90, 91, the collector of the second transistor 91 providing a system output signal. The impedance level of this output signal is lowered by the associated complementary emitter follower 72, and the output signals are then applied to the driver transformer 74 which is coupled to the motor drive amplifier 39 for the drum motor 35.

The pulse waveforms applied to the primary 94 of the transformer are converted into control signals of appropriate polarity for four separate transistors 96, 97, 98 and 99 coupled together in a bridge configuration in the motor drive amplifier 39. The bridge is coupled across a DC supply in the form of −18 volt and +12 volt sources. Secondary windings in opposite senses are coupled in the base-emitter circuits of each transistor of a different pair in the bridge, such as the pair 96, 97 and the pair 98, 99. A square wave output voltage is taken from the midpoint between each pair of transistors 96, 97 or 98, 99. At any instant, two diagonally opposed transistors 96 and 99 or 97 and 98 will be switched on, providing a potential difference across the windings of the drum motor 35, which potential difference is alternated in polarity with the square wave drive. The bases of two transistors, e.g. transistors 96 and 99, will be driven positive concurrently, causing the transistors 96, 99 to conduct and completing a current path between the −18 volt source, the transistor 96, the motor windings, the other transistor 99 and the +12 volt source. When the opposite transistors 97, 98 are switched on, the applied DC voltage is of the opposite polarity. Because the full potential difference between the supply terminals (in this case 30 volts) is applied to the motor 35 for each half cycle, the peak-to-peak or effective applied square wave amplitude is twice the maximum level available from the supply by virtue of the polarity reversing action of the motor drive circuit.

Therefore, a 60 cycle square wave for operating the motor with high efficiency is obtained from a circuit constructed of components containing relatively little iron (the only iron being that in the driver transformer). The odd harmonic components of the square wave drive signal do not result in instantaneous drum speed variations of appreciable magnitude, because of the use of a compliant coupling, described below, which forms a low pass mechanical filter in conjunction with the inertia of the head drum system.

The motor control circuits include a start circuit for increasing the starting torque so as to provide superior acceleration to normal running speed. Under the high current starting conditions, a motor start relay is energized, closing a switch 102 and placing a current limiting resistor 104 and a start capacitor 105 in parallel with the normal running capacitor 107. The motor start windings 109 are therefore utilized, until the drive current drops, at which time the motor start relay 101 is de-energized, the start capacitor 105 is removed from the circuit. A thermal switch 110 opens to disocnnect the windings, in the event of overheating of the motor 35.

Figure 3:
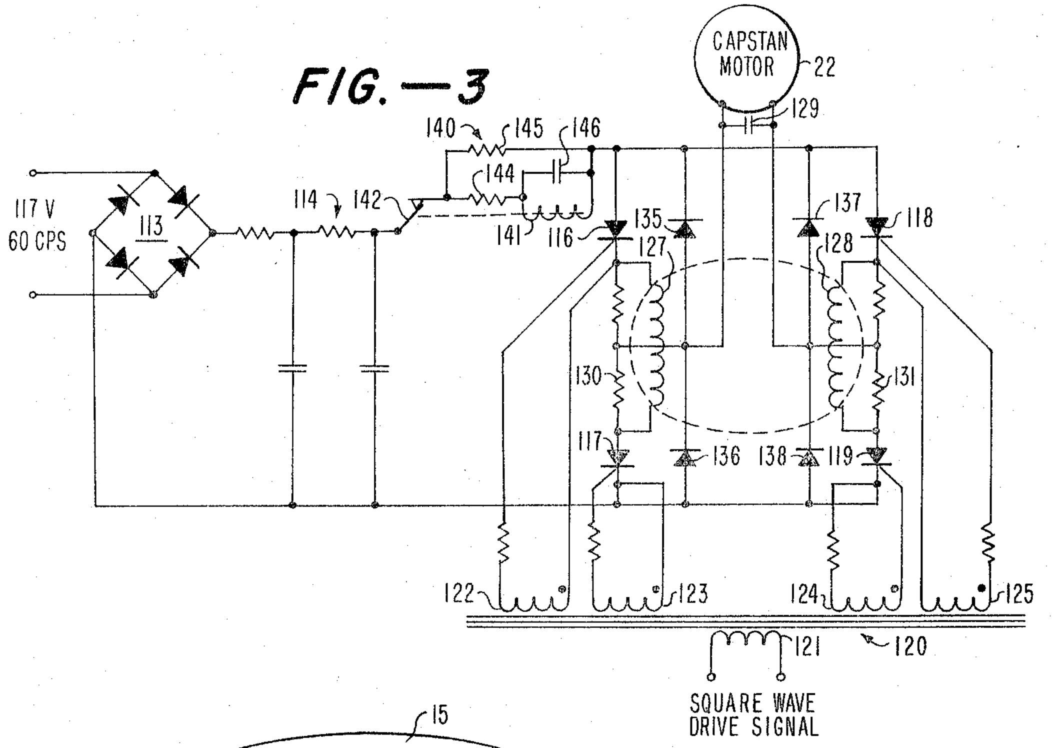
FIG. 3 is a schematic diagram of another form of motor drive circuit in accordance with the invention.

The low voltage DC supply square wave drive arrangement, as described, provides merely one example of a circuit which may be utilized in accordance with the invention. A preferred circuit is shown in FIG. 3, in which higher voltage but relatively lower cost silicon-controlled rectifiers are employed to generate the square wave drive signal. In the system of FIG. 3, relatively high voltage input signals (e.g. 117 volts at 60 cycles per second) are applied across a full wave diode rectifier 113, across the output terminals of which is coupled a ripple filter 114. The DC signal of approximately 150 volts, which is thereby generated, is applied across a bridge comprising four silicon-controlled rectifiers 116, 117, 118 and 119. The output terminals of the silicon-controlled rectifier bridge are coupled to the capstan motor 22, or the head drum motor as desired, or in accordance with the invention the square wave drive signal may be switched between these motors depending upon the mode of operation. Only the capstan motor 22 has been shown for simplicity.

The silicon-controlled rectifier bridge operates as an inverter, under the control of square wave drive signals provided from an associated source to the primary 121 of a driver transformer 120, the separate secondary windings 122, 123, 124 and 125 of which are coupled to the control electrode and cathode circuits of the individual silicon-controlled rectifiers 116–119 respectively. The silicon controlled rectifier bridge also includes reactive components in the output circuit coupling, in the form of mutually coupled inductances 127, 128 which are connected across resistances 130, 131 at the output terminals of the silicon-controlled rectifier bridge. Biasing diodes 135, 136, 137 and 138 are coupled within the bridge to shunt the silicon-controlled rectifiers 116–119.

The circuit also includes a protection circuit 140 comprising a relay coil 141 controlling an armature 142, a resistor 144 in series with the relay coil 141, and a resistor 145 and capacitor 146 which shunt the relay coil 141. The protection circuit 140 prevents the application of excessive current to the silicon-controlled rectifiers in the event of a short circuit, or incorrect commutation of the silicon-controlled rectifiers, as described above.

In the operation of the arrangement of FIG. 3, the full wave rectified, 150 volt DC signal applied across the silicon-controlled rectifier bridge is inverted under control of the square wave drive signal at the transformer 120 at a rate which provides the varying frequency square wave drive signal desired for the motor 22. The polarities of the secondaries 122–125 which control the firing of the individual silicon-controlled rectifiers 116–119 are arranged to control conduction in opposite pairs 116 and 119 or 117 and 118. Thus the polarity of the voltage applied across the motor is reversed at a controlled rate, and the motor 22 and associated elements are driven synchronously therewith. The only inductive elements which are used are the driver transformer 120 and the mutually coupled inductances 127, 128, which are small in size, and no power transformer with attendant weight and size and heat is required. In addition, the square wave switching provides extremely high efficiency in driving the motor in an economical fashion.

Because silicon-controlled rectifiers remain on, once fired, unless the anode goes negative relative to the cathode, some simple means of commutating the action of the silicon-controlled rectifiers in the bridge, to insure positive extinction of previously fired rectifiers when the remaining rectifiers are fired, is highly desirable. This is achieved, in accordance with the present invention, by the mutually coupled inductances 127, 128, in association with the capacitor 129 which bridges the motor. When a silicon-controlled rectifier, such as the rectifier 117, has remained conducting for its half cycle, and a firing signal is received for the coupled rectifier 116, a firing signal is also received for the rectifier 119. The resutling current surging through the mutually coupled inductances 127, 128 drives the anodes of the previously conducting rectifiers 117, 118 negative, thus extinguishing the previously conducting rectifiers 117, 118 and providing the desired commutating action. In addition, the provision of the mutually coupled inductances 127, 128 in the depicted circuit develops a limiting effect on the rise times of the voltages applied to the silicon controlled rectifiers 116–119, thus avoiding spontaneous turn-on from junction capacitance effects. The voltage drop across the diodes 135–138 aids in insuring turnoff.

The protection circuit 140 operates in a cycling fashion to interrupt the power signal to the silicon-controlled rectifier bridge in the event of circuit failure or improper firing. On startup, for example, transient conditions when power is initially applied may turn on all the rectifiers, because of the fact that firing of one pair is used to assist extinction of the other pair. If the rectifiers 116–119 are improperly fired, so that a short circuit effectively exists, then the voltage drop across the resistor 145 increases, and the relay coil 141 opens the single pole, single throw armature 142, interrupting the power to the silicon-controlled rectifiers 116–119. After a brief time interval, determined by the passive circuit comprising a resistor 144 and time delay capacitor 146, the relay coil 141 is de-energized, releasing the armature 142, so that power is again applied to the silicon-controlled rectifier circuit. The protection circuit 140 operates if the silicon-controlled rectifiers 116–119 fail to start when power is initially applied, or if a transient signal disturbs the regular commutation sequence. By interrupting the power signal in this manner, all silicon-controlled rectifiers are extinguished, and only the proper rectifiers are fired on the application of the next input drive signal when the protection circuit 140 again closes.

In the event that a short circuit condition is maintained, the protection circuit 140 also operates, but here the operation is for the purpose of interrupting the application of power at a relatively low frequency to limit the average power applied to the load. The cycling frequency of the protection circuit 140 is such that the resistor 145 can readily absorb the power applied under the given circumstances.

Figure 4:
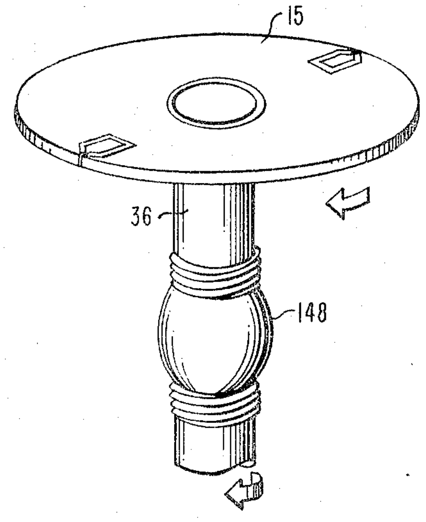
FIG. 4 is a perspective view showing in greater detail a compliant coupling employed in the arrangement of FIG. 1.

A detailed example of one form of compliant coupling which may be used in accordance with the invention in conjunction with square wave drive systems is shown in FIG. 4, as employed with a head drum 15. A particular shaft 36 which couples the motor (not shown in FIG. 4) to the head drum 15 is a two piece section which is coupled together by a resilient symmetrical rubber member 148. With a low cost drive motor, such as an induction motor which inherently has torque fluctuations, the application of a square wave drive signal, which contains odd harmonic frequency components, introduces further instantaneous speed variations in the speed of the driven member. In accordance with an aspect of the invention, this mechanical system forms a mechanical low pass filter. The rubber disk 148 is selected to have a torsional moment which is dependent primarily upon the moment of inertia of the shaft 36 and the head drum 15. In one specific example, the head drum had a 6.75 inch diameter, a moment of inertia of 0.00445 slug-ft.$^2$, and a nominal rotation rate of 1800 r.p.m. A synthetic rubber coupling member was employed in the drive. The coupling member was a unit sold by the Lord Mfg. Co., Erie, Pa., under Catalog No. V–1211–1–189, and had a 1.7 in.-lb. torque specification. Such couplings are intended for use for adjustment of alignment of driving and driven members, but when appropriately selected may be used in systems in accordance with the invention.

Although there have been described above and illustrated in the drawings various systems and methods for wideband recorders and reproducers, and output drive systems for the operation of scanning and rotation members therein, it will be appreciated that the invention is not limited thereto. It may not be required, for example, to economize by utilizing a single motor drive amplifier, or it may be preferred to operate different motor drive amplifiers from a single DC supply, or from DC supplies at different voltage levels. In this event, the alternating currents supplied may still be utilized for timing purposes, inasmuch as the zero crossing detector or other form of square wave generator operating off the alternating current signal may be used to effect the switching control of the motor drive amplifier when control is not exercised by the servo system.

It will therefore be appreciated that these and other modifications may be made in accordance with the spirit of the invention, and it should be understood that the invention is to be defined by the appended claims.

What is claimed is:

1. The method of improving the time base stability of a wideband recorder using a frequency controlled scanning head drum and a frequency controlled capstan which includes the steps of driving the capstan directly from a selected standard frequency power signal during the record mode, servoing the head drum speed to the selected standard frequency signal during the record mode, recording a timing control signal representative of head drum speed variations during the record mode, driving the head drum directly from the standard frequency power signal during the playback mode, and servoing the capstan speed to the previously recorded control track signal during playback.

2. The method of improving the time base stability of a recorder system using a relatively fast moving member and a relatively slow moving member in interrelated fashion which includes the steps of servoing the relatively fast moving member to a time stable reference during recording while driving the relatively slow moving member directly from a power source, generating and recording a timing control signal representative of speed variations of both the relatively fast moving member and the relatively slow moving member during recording, reproducing the timing control signal during playback, and controlling the speed of the relatively slow moving member in accordance with the relationship between the reproduced timing control signals and then generated timing control signal during playback, while driving the relatively fast moving member directly from the power source.

3. The method of operating a recording and playback system using a relatively fast scanning member which scans a record member, and a relatively slow drive member which advances the record member, which includes the steps of controlling the scanning member in relation to a first reference while operating the drive member synchronously with an alternating power signal during recording and controlling the drive member in relation to a second reference while operating the scanning member synchronously with the alternating power signal during playback.

4. The method of improving the time base stability of a wideband recorder using a scanning head drum and a capstan which includes the steps of driving the capstan synchronously with a standard frequency power signal during the record mode, servoing the head drum speed to the selected standard frequency during the record mode, providing a control track signal representative of head drum speed variations during the record mode, driving the head drum synchronously with the power signal during the playback mode, and servoing the capstan speed to the prevoiusly recorded control track signal during the playback mode.

5. The method of operating a wideband recording and reproducing system having a scanning head drum and a capstan which together determine the time base of recorded and reproduced signals which includes the steps of servoing head drum speed variations to a reference during recording while driving the capstan in synchronism with a power source, recording a timing signal representative of speed variations during recording, servoing the capstan to the recorded speed variations during playback, and driving the scanning head drum directly from the power source during playback.

6. A method as set forth in claim 5 above, wherein the system is a magnetic tape recording and playback system, wherein the timing signal is generated from the scanning head drum and recorded on the tape, and wherein servo control of the capstan during playback is effected by comparing the timing signal then generated from the head drum with the previously recorded timing signal on reproduction.

7. A time base control system for a wideband magnetic tape recording and playback system which utilizes a scanning head drum and a tape drive capstan, including: means associated with the scanning head drum for providing a timing control signal; control signal record and reproduce means associated with the magnetic tape; means providing a power signal having a selected frequency; means, including time reference means, coupled to receive the timing control signal, for providing a servo control signal; means responsive to the servo control signal for providing a motor power signal of controlled frequency; means operating the scanning head drive from the motor power signal during operation in the record mode and from the power source during operation in the playback mode; and means operating the tape drive capstan from the motor power signal during operation in the playback mode and from the power source during operation in the record mode.

8. A time base control system for a wideband magnetic tape recording and playback system which utilizes a scanning head drum and a tape drive capstan, including: means providing a time stable reference signal; means providing an alternating current power signal; means providing a control signal representative of scanning head drum speed during record and playback modes of operations; means operating during recording to record the control signal; means operating during playback to reproduce the previously recorded control signal; phase comparator means for generating a speed control signal representative of the difference in phase relationship of two applied signals; means coupling the reference signal and the control signal to the phase comparator means during operation in the record mode; means coupling the reproduced control signal and the new control signal to the phase comparator means during operation in the playback mode; means responsive to the speed control signal for providing a motor drive signal; and means for driving the capstan from the alternating current power signal and the head drum from the motor drive signal during operation in the record mode, and the capstan from the motor drive signal and the head drum from the alternating current power signal during operation in the playback mode.

9. A time base control system for a wideband magnetic tape recording and playback system which utilizes a scanning head drum and a tape drive capstan, including means providing a stable time reference signal in the form of a pulse series having a given frequency; means providing an alternating current power signal having the same frequency as the reference signal; means, including tachometer means mounted on the scanning head drum, for providing a control signal representing the scanning head drum speed in a pulse sequence; means associated with the magnetic tape and operating during recording to record the control signal as it is provided; means operating during playback to reproduce the previously recorded control signal; phase comparator means having a pair of input terminals for receiving signals to be compared and generating a speed control signal in response thereto; means coupling the reference signal and the control signal as it is provided during record to the phase comparator means during operation in the record mode; means coupling the reproduced control signal and the control signal as it is provided from the scanning head drum to the two inputs of the phase comparator means during operation of the playback mode; means, including a square wave power signal generator means, responsive to the speed control signal, for providing a motor drive signal in the form of a square wave power signal having a frequency determined by the speed control signal; capstan motor means, including a compliant coupling, connected to the tape drive capstan; head drum motor means, including a compliant coupling, connected to the scanning head drum; and means for driving the capstan motor means from the alternating current power signal, and the head drum motor means from the motor drive signal during operation in the record mode, said means also including means for driving the capstan motor means from the motor drive signal and the head drum motor means from the alternating current power signal during operation in the playback mode.

10. In a wideband tape recording system using a scanning head drum and tape drive capstan, a system for economically minimizing time base errors during both recording and playback, comprising: a source of a selected time stable standard frequency signal, means coupled to the head drum for providing a tachometer signal which is nominally at the selected standard frequency, a source of an alternating power signal having the selected standard frequency, means operatively associated with the tape for recording and reproducing timing signals from said tachometer signal, phase comparator means having a pair of inputs, a first input being coupled to receive said tachometer signal as provided during record and playback modes, and the second input being coupled to receive the reproduced timing signal when the system is in a playback mode, the phase comparator means providing an analog servo output signal, first synchronous means for driving the drum, second synchronous means for driving the capstan, means coupled to receive the servo output signal for generating an alternating wave at a frequency dependent on the servo output signal, and means coupling the alternating power signal to the second synchronous means during recording and to the first synchronous means during playback, and coupling the generated alternating wave to the first synchronous means during recording and to the second synchronous means during playback.

11. In a wideband tape recording system using a frequency controlled scanning head drum and tape drive capstan, a system for economically minimizing time base errors during both recording and playback, comprising: a source of a selected time stable standard frequency signal; means coupled to the head drum for providing a tachometer signal which is nominally at the selected standard frequency, said tachometer signal varying principally with speed changes in the head drum, a source of an alternating power signal having the selected standard frequency, means operatively associated with the tape for recording and reproducing timing track signal from said tachometer signal, phase comparator means having a pair of inputs, a first input being coupled to receive said tachometer signal, means responsive to said standard frequency signal and to said timing track signals for coupling said timing track signals to the second input of the phase comparator means when the system is in a playback mode, and coupling the standard frequency signal to the second input when the system is in a record mode, variable frequency oscillator means coupled and responsive to said phase comparator means, motor drive amplifier means responsive to said variable frequency oscillator means and providing a square wave motor drive signal, a synchronous head drum motor, a synchronous capstan motor, and means coupling said power signal and the motor drive signal to said head drum motor and the capstan motor in alternate fashion, the head drum motor being coupled to receive the power signal when the system is in the playback mode, and the capstan motor being coupled to receive the power signal when the system is in the record mode, and filtering means comprising a compliant mechanical coupling between the head drum motor and the head drum, and a compliant mechanical coupling between the capstan motor and the capstan.

References Cited

UNITED STATES PATENTS

| | | | |
|---|---|---|---|
| 2,866,012 | 12/1958 | Ginsburg et al. | 179—100.2 |
| 3,081,381 | 3/1963 | Merry | 179—100.2 |
| 3,200,816 | 8/1963 | Coleman et al. | 178—6.6 X |
| 3,270,130 | 8/1966 | Hurst et al. | 179—100.2 X |
| 3,293,359 | 12/1966 | Yasuoka et al. | 179—100.2 X |

BERNARD KONICK, *Primary Examiner.*

L. G. KURLAND, *Assistant Examiner.*